G. M. BICKNELL AND H. H. C. WEED.
FLOATING BEARING.
APPLICATION FILED JULY 15, 1918.
1,324,375.
Patented Dec. 9, 1919.
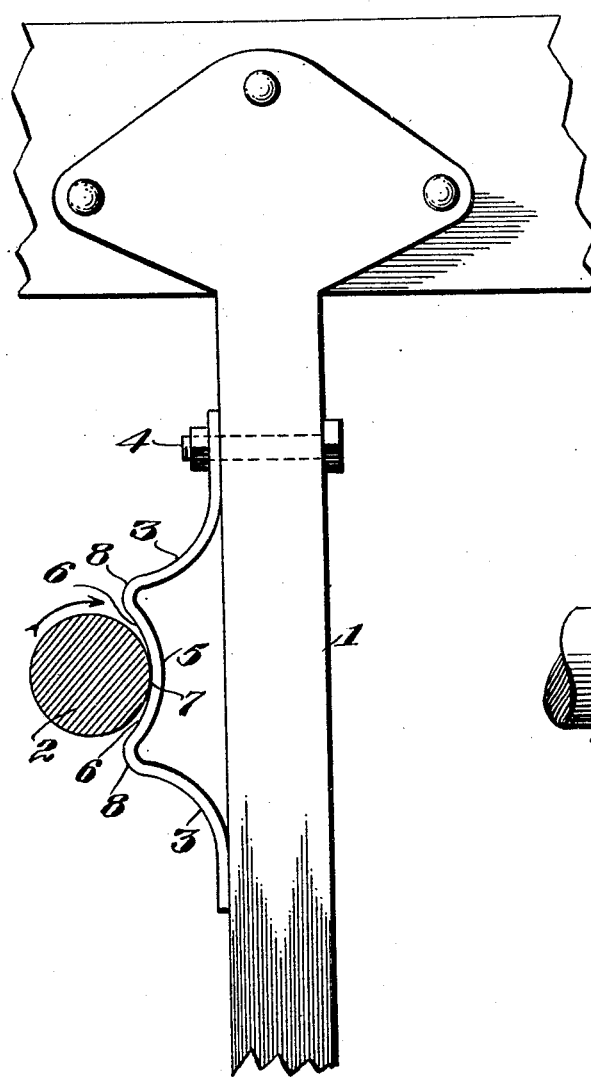
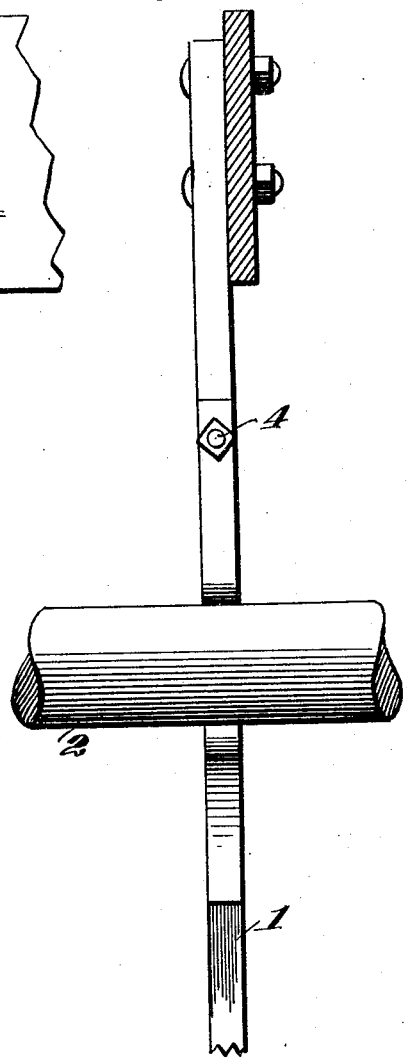
Inventors
George M. Bicknell.
Hugh H. C. Weed.
By
Attorney.

UNITED STATES PATENT OFFICE.

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,324,375.      Specification of Letters Patent.      Patented Dec. 9, 1919.

Application filed July 15, 1918. Serial No. 245,009.

*To all whom it may concern:*

Be it known that we, GEORGE M. BICKNELL and HUGH H. C. WEED, citizens of the United States, and residing at Detroit, in the county of Wayne, Michigan, and at St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally as least two in number, and the portions of the shaft which are subjected to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger that its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement in all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view of the device, showing the shaft in section; and

Fig. 2 is a side elevation.

The invention comprises a rigid bar 1, fixed to any convenient portion of the automobile, and positioned to extend adjacent the shaft 2. In the embodiment here shown, the bar 1 is fixed to a cross-member, and is provided with a spring member 3, secured to the bar by a bolt 4 passing through the spring member and bar. The spring 3 is preferably concaved at 5, at a point laterally of the shaft, the curved portion describing an arc of a circle of greater diameter than the diameter of the shaft.

From the foregoing it is clear that we have devised a novel means for preventing a yielding resistance of lateral movement of the shaft in one direction (to the right as shown in the drawing). In the rotative movement of the shaft, if it acquires a whipping tendency when traveling in the direction of the arrow, it will first strike against the edge 6 of the concaved surface of the spring member, and will ride down the face of the spring and effect a positive contact at the point 7. It will be noted that this construction effects a sure means of contact of the shaft with the spring face, and prevents contact with and consequent breakage of the projecting point 8 of the spring.

From the above it will be noticed that we have provided means for imposing a yielding resistance to movement of the shaft in one direction, and that, consequently, a true circular path of travel of the shaft may not be assumed.

It is obvious that in actual practice of the invention, lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

What we claim is:—

1. A device of the character described comprising, in combination with a rotatable shaft, a member located adjacent the shaft, and means on said member adapted to resiliently resist movement of the shaft in one direction, said means comprising a spring element provided with a concaved face adapted for contact by said shaft.

2. A device of the character described comprising, in combination with a rotatable shaft, a member located adjacent the shaft, and means on said member adapted to resiliently resist movement of the shaft in one direction, said means comprising a spring element having a concaved face describing an arc of a circle of larger diameter than the shaft.

In testimony whereof we affix our signatures.

GEORGE M. BICKNELL.
HUGH H. C. WEED.